Feb. 9, 1937.  L. F. COE  2,070,041
GARDEN IMPLEMENT
Original Filed July 30, 1934
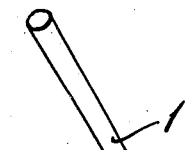
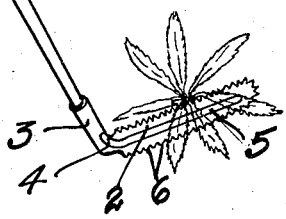
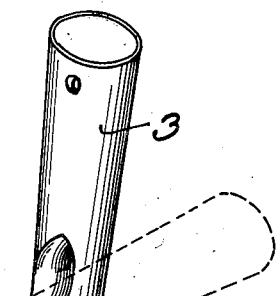
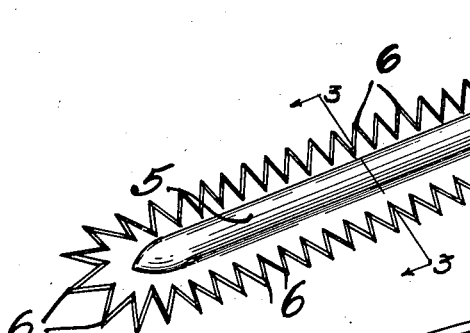
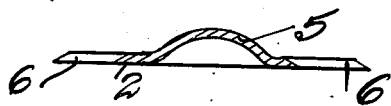
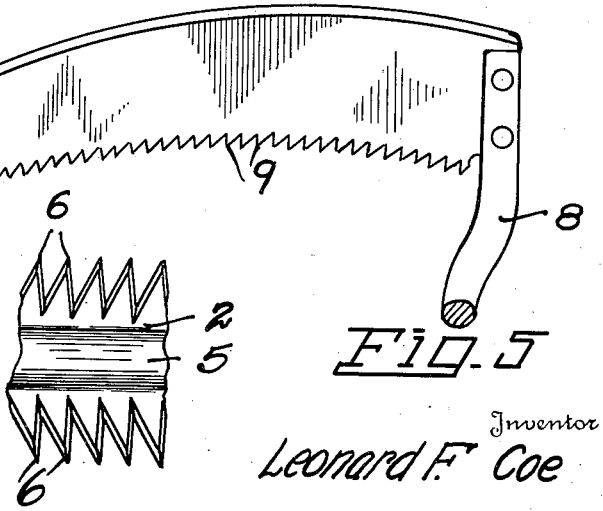
Inventor
Leonard F. Coe
By Glenn L. Fish
Attorney Patented Feb. 9, 1937

2,070,041

UNITED STATES PATENT OFFICE 2,070,041

GARDEN IMPLEMENT

Leonard F. Coe, Spokane, Wash.

Application July 30, 1934, Serial No. 737,593
Renewed July 20, 1936

1 Claim. (Cl. 30—9)

This invention relates to garden implements and more particularly to a weeder, one object of the invention being to provide an implement of this character so constructed that dandelions and other weeds can be easily removed from a lawn or garden while standing in an upright position.

Another object of the invention is to provide an implement for removing weeds consisting of a blade at the lower end of a staff adapted to be gripped and swung in the same manner that a golf club is used, thereby not only permitting weeds to be easily removed but also permitting the operator to practice golf strokes while removing weeds and thereby make the work less tedious.

Another object of the invention is to provide the device with a blade which is so formed that it will not easily bend out of its proper shape when in use and to further provide a blade having teeth along its edges and free end so shaped that they will easily cut through the root of a weed when the implement is in use.

Another object of the invention is to provide an improved weeding implement which is simple in construction, strong and durable and low in cost.

The invention is illustrated in the accompanying drawing, wherein:

Figure 1 is a perspective view of the improved weeding implement.

Figure 2 is an enlarged perspective view of the blade and its socket.

Figure 3 is a section taken transversely through the blade along the line 3—3 of Figure 2.

Figure 4 is a fragmentary top plan view of the blade.

Figure 5 is a top plan view of a sickle made in accordance with this invention.

This improved weeding implement consists briefly of a staff or handle 1 and a blade 2 having at one end a socket 3 into which the lower end of the staff fits. The blade is formed of strong steel and the blank has one end portion rolled to form the staff receiving socket, the portion 4 between the blade and socket being reduced in width to provide a neck and allow the socket to be bent upwardly and extend at an incline from the blade. The angle between the blade and socket is such that when the handle is grasped after the manner in which the staff of a golf club is held, the blade will be approximately parallel to the ground and the roots of a dandelion can be easily cut through by reciprocating the blade longitudinally against the roots or by swinging the implement after the manner in which a golf club is used and cutting the weed off close to the ground when the blade strikes the root.

In order to strengthen the blade and prevent it from bending, the intermediate portion thereof has been bent to form a longitudinally extending upstanding rib 5 which extends from adjacent the forward free end of the blade and partially up the front of the socket 3. This rib not only prevents the blade from bending easily but also strengthens the neck 4 and prevents the blade being bent out of its proper angular relation to the staff or broken off from the socket.

It is desired to have the blade cut easily through the tough roots of weeds and therefore the side edges and free end portion of the blade have been serrated to form teeth 6. Referring to Figure 4 it will be seen that these teeth have straight rear edges and rearwardly inclined front edges, both of which are sharpened, and therefore the roots will be quickly cut through if the blade is swung into engagement with the roots or placed in position against the roots and reciprocated. It will also be noted that by providing teeth at the free front end of the blade, this end can be disposed in engagement with the ground close to a weed and a thrusting force then applied to force the blade into the ground. During this movement the teeth will cut through the roots and the blade can then be tilted with a prying motion to lift the weed out of the ground together with the portions of the roots which have been cut off under the ground. A person who prefers to uproot weeds in this manner can bend the socket to a position in which it extends axially of the blade or the socket may be left in alinement with the blade when manufacturing the implement.

The sickle illustrated in Figure 5 has a blade 7 which is formed of steel and curved longitudinally with its front and rear edges intersecting at the free end of the blade. A handle engaging shank 8 projects from one end of the blade and along its front edge the blade is serrated to form teeth 9 which correspond to the teeth 6 and permit tough weeds or other vegetation to be easily cut when the sickle is used in the usual manner.

Having thus described the invention, what is claimed is:

In a weeding implement, a blade and handle receiving socket formed from an elongated blank of metal bent in spaced relation to its rear end to form a straight horizontally disposed blade and a tubular socket extending upwardly from the rear end of the blade at a rearward incline, the intermediate portion of the blank being crimped to form an upwardly disposed transversely arcuate reinforcing rib of less width than the width of the blade and the diameter of the socket and extending longitudinally of the blade from adjacent the front end of the blade and having its rear portion extending upwardly along the lower portion only of the socket to strengthen the united ends of the blade and socket, the blade being serrated along its side edges and across its front end to form teeth, and a handle in the form of a straight staff having its lower end fitting into the socket.

LEONARD F. COE.